(12) United States Patent
Schumer et al.

(10) Patent No.: US 8,331,195 B1
(45) Date of Patent: Dec. 11, 2012

(54) COMPUTER IMPLEMENTED SENSOR DATA ANALYSIS

(75) Inventors: Sean Schumer, Hoboken, NJ (US); Mark Mellini, Denville, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 355 days.

(21) Appl. No.: 12/582,071

(22) Filed: Oct. 20, 2009

Related U.S. Application Data

(60) Provisional application No. 61/106,687, filed on Oct. 20, 2008.

(51) Int. Cl.
*H04B 1/06* (2006.01)
(52) U.S. Cl. .................................. 367/136; 340/566
(58) Field of Classification Search .................. 367/136; 340/566
See application file for complete search history.

(56) References Cited

U.S. PATENT DOCUMENTS

| | | | | |
|---|---|---|---|---|
| 3,585,581 A | * | 6/1971 | Aune et al. | 367/136 |
| 3,891,865 A | * | 6/1975 | Picard et al. | 327/37 |
| 3,995,223 A | * | 11/1976 | Gimber et al. | 327/25 |
| 4,408,533 A | * | 10/1983 | Owen et al. | 102/211 |
| 4,604,738 A | * | 8/1986 | Aggarwal et al. | 367/135 |
| 4,630,246 A | * | 12/1986 | Fogler | 367/135 |
| 4,811,308 A | * | 3/1989 | Michel | 367/136 |
| 5,054,006 A | * | 10/1991 | Gimber et al. | 367/136 |
| 5,161,127 A | * | 11/1992 | Grosch | 367/124 |
| 7,034,716 B2 | * | 4/2006 | Succi et al. | 340/935 |
| 7,616,115 B2 | * | 11/2009 | Horak et al. | 340/566 |
| 7,714,714 B2 | * | 5/2010 | Voglewede et al. | 340/539.26 |
| 2006/0241916 A1 | * | 10/2006 | Sieracki | 702/189 |

FOREIGN PATENT DOCUMENTS

GB 2338540 A * 12/1999

* cited by examiner

*Primary Examiner* — Ian Lobo
(74) *Attorney, Agent, or Firm* — Henry S. Goldfine (57) ABSTRACT

A computer implemented method, program and system utilizing a number of field-deployed sensors to accurately detect and classify objects/events (targets) of interest within a sensor field including the detection/classification of human beings travelling on-foot or with vehicles and their direction(s) of travel. In particular, the method, computer program and system are operable to determine whether a detected target is an animal, human or vehicle via analysis of received acoustic and sensor data. The analyses performed include comparison/correlation of the sensor data to known seismic cyclostationary signatures, acoustic and seismic characteristics of human footsteps and travel tendencies, and acoustic and seismic characteristics of non-human (animal) footsteps and travel tendencies.

23 Claims, 6 Drawing Sheets

COMPUTER IMPLEMENTED SENSOR DATA ANALYSIS

CROSS REFERENCE TO RELATED APPLICATION

This application claims the benefit of U.S. Provisional Patent Application Ser. No. 61/106,687 filed Oct. 20, 2009 which is incorporated by reference as if set forth at length herein.

U.S. GOVERNMENT INTEREST

The inventions described herein may be manufactured, used and licensed by or for the U.S. Government for U.S. Government purposes.

FIELD OF THE DISCLOSURE

This disclosure relates generally to the detection and discrimination of objects/events which may occur—for example—on a battlefield. More particularly, it pertains to a method that uses a number of disparate sensors including, for example, infrared (IR), seismic, acoustic and/or magnetic sensors deployed in the field to detect and classify objects/events of interest.

BACKGROUND OF THE DISCLOSURE

As can be readily appreciated, the ability to readily detect/classify/discriminate objects/events is of great significance in a battlefield environment. More particularly, such an ability increases an overall situational awareness for a field commander while reducing a "fog of war" effect so common in military active battlefield environments.

SUMMARY OF THE DISCLOSURE

An advance is made in the art according to an aspect of the present disclosure directed to a computer-implemented method utilizing a number of disparate, field-deployed sensors to accurately detect and classify objects/events (targets) of interest within the field. More particularly and according to one aspect of the present disclosure the method detects/classifies human beings travelling on-foot or with vehicles and their direction(s) of travel.

In an exemplary embodiment of the present disclosure, a computer implemented method collects and analyzes raw data from sensors including, for example, IR, seismic, acoustic and magnetic sensors deployed in the field, so as to detect and classify objects/events (targets). The targets are uniquely and accurately detected through the use of our inventive method(s) that—when the results of same are compared—can produce a reliable decision as to the identification and direction of movement of the target.

BRIEF DESCRIPTION OF THE DRAWING

A more complete understanding of the present disclosure may be realized by reference to the accompanying drawings in which:

FIG. 3(*a*) is a schematic flow diagram depicting an overview of the steps associated with seismic classification and analysis (impulsive footstep and cyclostationary vehicular) according to an aspect of the present disclosure;

FIG. 3(*b*) is a graph showing a seismic analysis of a horse signature which reports a low confidence;

FIG. 3(*c*) is a graph showing a seismic analysis of a human signature which reports a high confidence;

DETAILED DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, any switches shown in the FIGs. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

As noted, one aspect of the present disclosure is the use of a number of sensors which may be used to sense/distinguish/classify field events. These sensors, in conjunction with software, processing hardware, and communications devices are deployed and coordinated into an operational system. Notably, systems according to the present disclosure may be advantageously deployed and executed on remote (fielded) devices, which may be in communication with a base or other station(s) thereby forming larger, more disparate networks. Since these systems may be fielded into remote locations, power consumption of the devices is of utmost concern.

Figure 1:
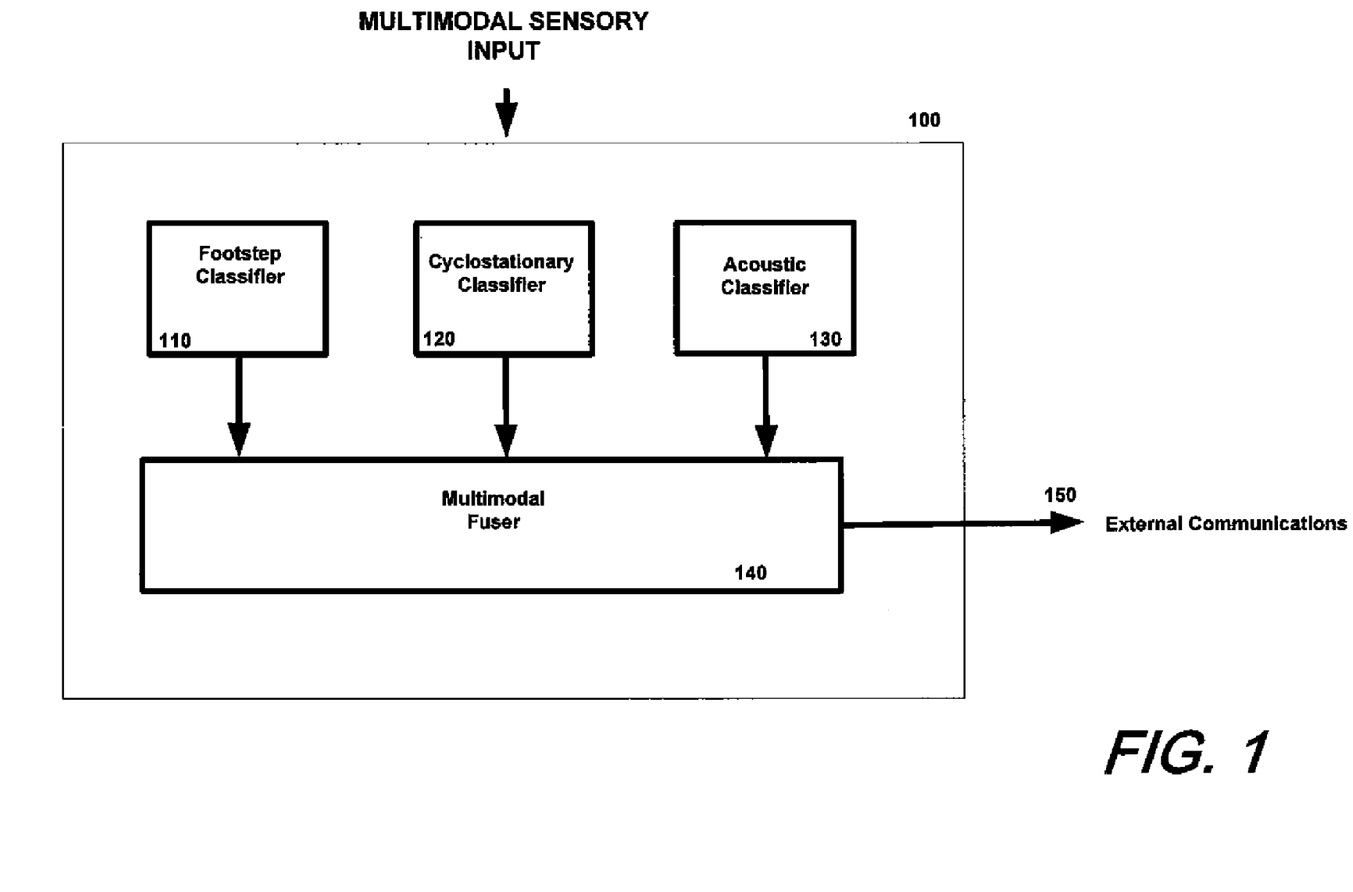
FIG. 1 is a schematic diagram of an exemplary field architecture in which our inventive method may operate.

With reference now to FIG. 1, there is shown a schematic block diagram depicting a representative architecture in which our inventive method may operate. Systems 100 constructed according to the architecture will generally include a number of components including: a seismic footstep classifier (110), a seismic cyclostationary classifier (120) also known as a vehicle classifier; an acoustic classifier (130); and a multimodal fuser (140). Since such systems will operate remotely, a wireless communications module (150) for communications with—for example, the base station—will also be part of a typical configuration.

Those skilled in the art will readily appreciate that a number of the components shown in the architecture may be advantageously implemented in software which in turn may be executed on any of a variety of contemporary microprocessors/microcomputers suitably configured for field deployment. Consequently, operating from battery or field generated power is contemplated.

It is also worth noting that while a wireless remote configuration is explicitly contemplated and described, those skilled in the art will appreciate that wired (electrical or optical or combinations thereof) communications between these remote systems and base stations are possible and foreseen as well. In addition, it may be practical in certain configurations to have power distribution and or generating capabilities included in one or more such remote systems as well. While such components are not explicitly shown or described herein, it is within the ordinary skill in the art to provide such capabilities to our inventive teachings.

Figure 2:
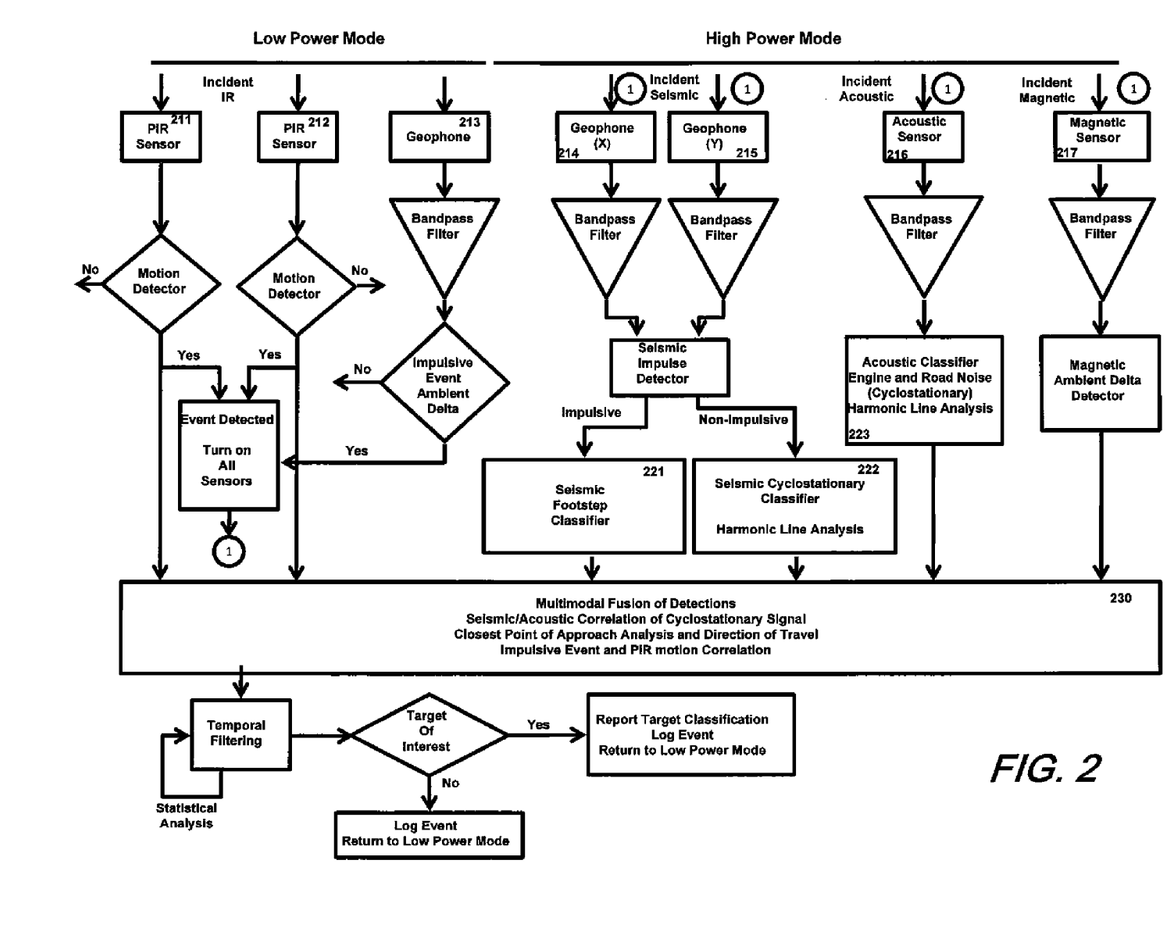
FIG. 2 is a schematic diagram of an exemplary overall architecture in which our inventive method may operate.

Turning now to FIG. 2, there is shown an overall sensor system architecture 200 according to an aspect of the present disclosure. Generally speaking, an overview of the architecture 200 includes—sensory elements (211—217), classifier elements (221-223) and multimodal fuser element 230. In its most basic embodiment, the seismic footstep classifier (221), the seismic cyclostationary classifier (222) and the acoustic classifier (223) receive raw data collected by seismic and acoustic sensors and classifies this raw data and then provides the analyzed classifications to the multimodal fuser (230) by which a target determination is made and provided. Importantly, and as shown in the FIG. 2, since the raw sensor data from the IR sensors, and magnetic sensors is in binary form, it may be advantageously provided to the multimodal fuser 230 in raw, binary form where it may be used in conjunction with the provided classifications for target determination.

As noted previously, remote field deployment and/or operation of a sensor system and method according to the present disclosure necessitates power considerations. As may be observed in the FIG. 2 architecture diagram, low-power and full-power modes of operation are contemplated.

More particularly, a number of the sensors including Infra-Red (IR) sensors 211, 212 as well as geophone 213 may operate in a low power mode to detect motion and/or some other impulsive event. Even while operating in low power mode, raw data from the IR sensors may advantageously be conveyed to the multimodal fuser 230. Should such motion and/or impulsive event occur, then a high power mode of operation may be invoked whereby additional classification and/or determination(s) made.

With high-power operation, sensory data is classified and "fused", such that a target determination may be made. In particular, as incident seismic data is generated by geophone (X) (214) and geophone(Y) (215) it is detected by seismic impulse detector where it is directed to either a seismic footstep classifier (221) or seismic cyclostationary classifier (222) for analysis and forwarding to multimodal fuser (230).

Similarly, acoustic sensor (216) provides acoustic data to an acoustic classifier (223) which in turn classifies the acoustic data and forwards same to multimodal fuser (230). Magnetic sensor provides magnetic data to magnetic detector which in turn provides its binary output to the multimodal fuser (230).

As may now be appreciated, the multimodal fuser receives the multiple detections (data output from each of the footstep classifier, seismic cyclostationary classifier and acoustic classifier) and performs—for example—seismic/acoustic correlation of cyclostationary signals; a closest point of approach analysis including direction of travel; and an impulsive event and IR motion correlation and an overall determination is made as to whether the detection(s) result from a target of interest. If so, the target is classified, notifications are generated (not specifically shown in FIG. 2) and a return to low power operation is performed. If, on the other hand, the target is not one of interest, then the event may be logged and low power mode is resumed.

The seismic footstep classifier 221 receives as input raw seismic sensor data, and analyzes same to determine whether a human is present by determining whether the sensed seismic activity is impulsive (human or animal) or repetitive (cyclostationary, i.e., repetitive mechanical/engine sounds).

Figure 3A:
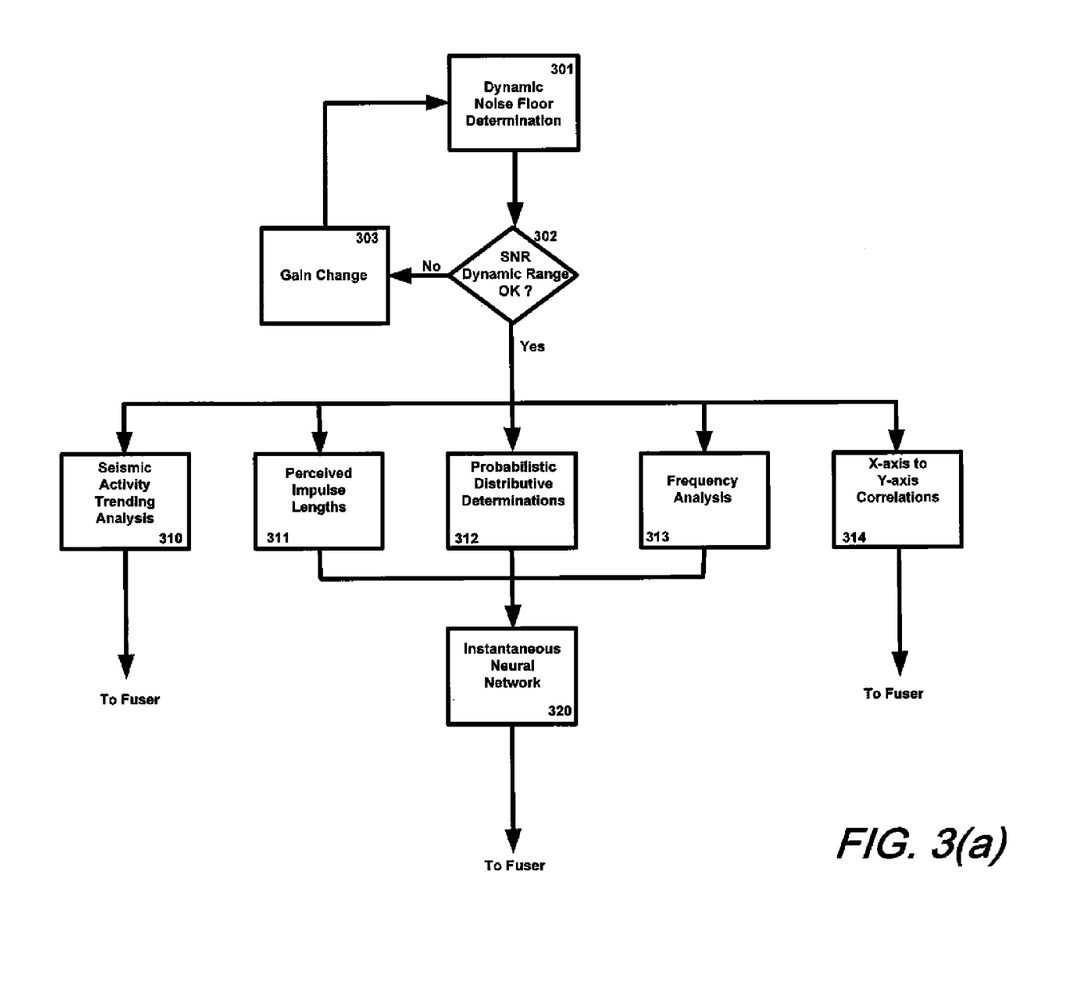

With reference now to FIG. 3(*a*), there is shown a flow diagram depicting an overview of the steps associated with full-power mode acoustic analysis and classification according to an aspect of the present disclosure. And while this overall procedure is applicable to impulsive footstep and cyclostationary vehicular analysis, we will begin our discussion with the footstep analysis and classification.

More particularly footstep classification involves a dynamic noise floor determination in which, seismic activity is analyzed to determine whether there is any seismic activity of interest. For example, the footstep classifier determines whether the seismic activity is characteristic of human footsteps, animal footsteps, etc. In one preferred embodiment, such a noise floor determination is made by detecting rapid deviations from a self-perceived noise floor.

Once the dynamic range and signal-to-noise characteristics are determined acceptable (blocks 301, 302, 303), X-axis and Y-axis seismic activity is analyzed to determine if the seismic activity of interest correlates to seismic activity caused by a human walking (block 314).

As may be observed from FIG. 3(*a*), a number of characteristics of seismic activity are verified before concluding that a target is a walking human. First the length (in time) of the impulsive seismic event is determined (block 311). Second, a probability distribution of the seismic signal is determined so as to determine how extreme any deviations are by—for example—analyzing the fourth standardized moment of the seismic signal (block 312).

A frequency analysis (block 313) determines the general shape of the seismic signal so as to account for any heal-to-toe gait that may be unique to human footsteps. In a preferred embodiment, such frequency analysis is performed by analyzing the decay of the seismic activity of a single impulsive event, as the heel-to-toe event will "draw out" the length of the seismic event.

Seismic activity trending analysis (block 310) examines the window of time in which a target is detected, and the general behavior of seismic activity over that window is determined. As may be appreciated by those skilled in the art, humans travel in a particular direction generally to reach a specific destination. Consequently, they should not be active in a sensor/detection field for more than a time that it would take a slow moving human to cross through the field. Accordingly, one aspect of the present method evaluates the seismic activity to find an upward trend in intensity followed by a consistent downward trend in over time.

In a preferred embodiment, the perceived impulse lengths (block 311), probabilistic distributive calculations (block 312) and frequency analysis (block 313) are evaluated by a neural network (block 320) thereby increasing the confidence level of the classification in the fuser. The seismic activity trending analysis (block 310) and X-axis to Y-axis correlations (block 314) may be provided directly to the fuser.

Advantageously, the cyclostationary classifier (vehicle classifier) is similar to that employed for the impulsive footstep classification. However, it preferably includes a harmonic line analysis as the "frequency analysis" (block 313) which is performed on raw sensor data classified as cyclostationary to assist with the vehicle classification.

Those skilled in the art will now appreciate a number of aspects of the seismic classification (footstep and vehicle) according to the present disclosure and outlined in the flow diagram in FIG. 3(*a*). More particularly the present method employs an impulse property determination that considers both the length of the impulse(s) and the probabilistic properties of the impulse(s). For cyclostationary classification (vehicle classification), a harmonic line analysis is employed to determine vehicle classification(s). The results of these determinations are further processed by a neural network thereby increasing the confidence of the classification for use by the fuser.

Additionally trends of seismic activity are determined as verification (or not) of the presence of vehicles within range of the sensor(s). Finally, X-axis and Y-axis multiple feature correlations are performed to determine approximate location(s) of target(s).

Figure 3B:
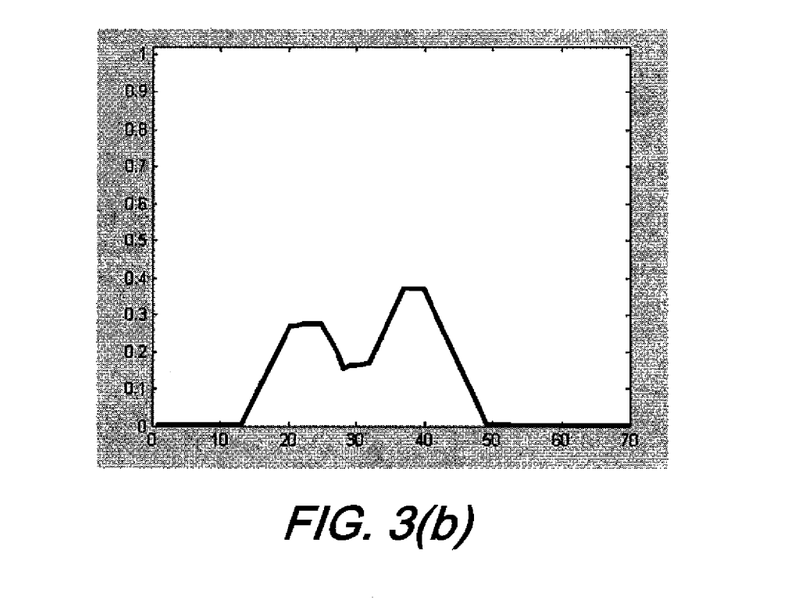
Figure 3C:
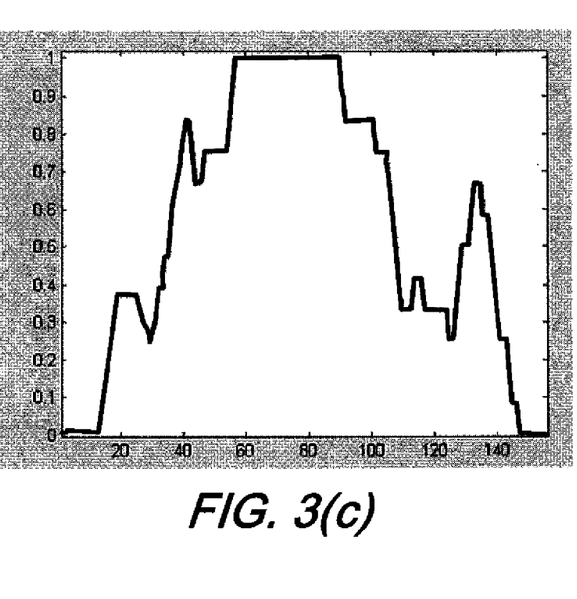

Each cycle of the method (i.e., footstep classification, seismic cyclostationary classication and acoustic classification) outputs to the multimodal fuser. As we will discuss later, the fuser outputs to a probabilistic temporal filter prior to sensor system providing an indication (i.e., alarm) to user(s) of the system. As an example of this classification, FIG. 3(*b*) and FIG. 3(*c*) shows two graphs characteristic of a horse signature (FIG. 3(*b*)) having a low confidence and a human signature (FIG. 3(*c*)) having a high confidence as provided to the fuser.

Figure 4:
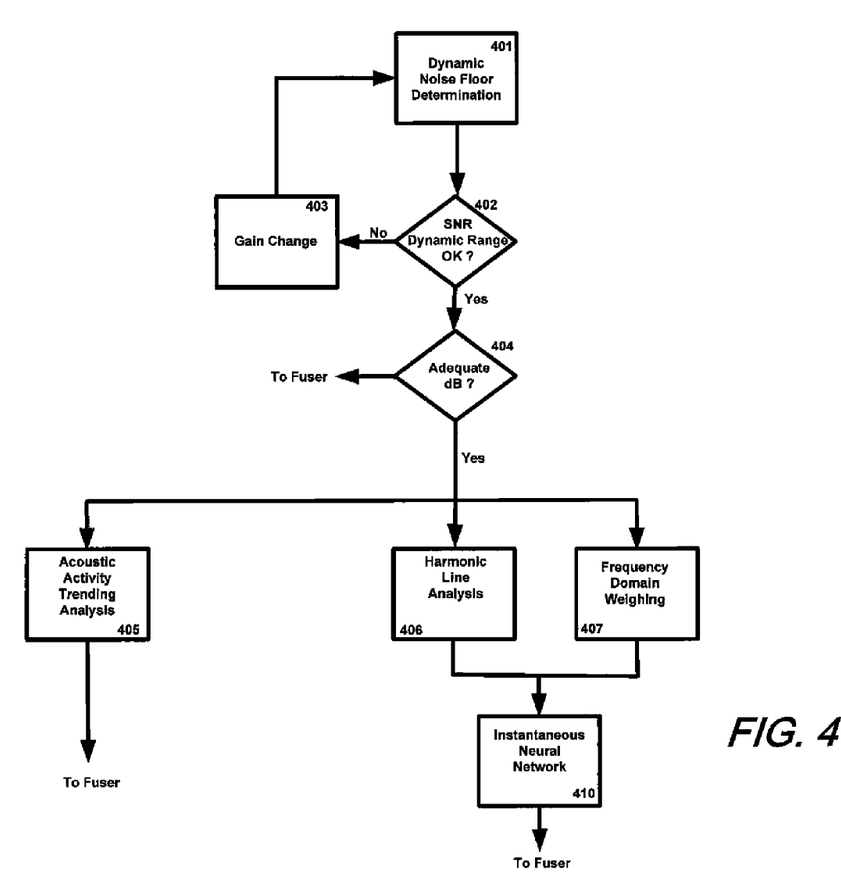
FIG. 4 is a schematic flow diagram depicting an overview of the steps associated with acoustic classification and analysis according to an aspect of the present disclosure.

FIG. 4 is a schematic block flow diagram of an acoustic classification method according to an aspect of the present disclosure. The acoustic classification method analyzes raw acoustic sensor data to determine whether acoustic data is representative of vehicle noise and, if so, the possible identities (types) of vehicle(s) and probability thereto.

More particularly, the acoustic classifier first undergoes a dynamic noise floor determination and dynamic range determination to set any background characteristics (blocks 401-403). If there is insufficient signal dB to indicate the presence or even the determination of a vehicle, then the raw data is simply provided to the fuser (block 404).

As shown, vehicle classification takes into consideration at least three component characteristics namely, trending analysis (block 405), harmonic line analysis (block 406), and frequency domain weighting (block 407).

A simplified envelope process is applied to the acoustic data to determine any signal trending that would be indicative of a passing vehicle. The output of the trending analysis is provided directly to the fuser.

Vehicle classification analyzes the frequency domain of the acoustic signal in an attempt to identify harmonic frequencies which are indicative of a vehicle engine. Due to the need to detect any type of vehicle engine and the fact that system need be deployed in any environment, a simple harmonic analysis is insufficient for vehicle detection. More particularly, naturally occurring sounds such as loud insects or sounds produced by man-made structures such as transformers or power generators may be mistaken for a vehicle engine. In order to eliminate this possibility the frequency domain is analyzed to determine the weight(s) of specific frequencies common to vehicle engines. That weight is compared to frequency ranges that tend to have significance in ambient signals. The output(s) of the harmonic line analysis and frequency domain weighting are provided to an instantaneous neural network (block 410) for further processing, the output of which is provided to the fuser.

Those skilled in the art may now appreciate certain particular characteristics of this acoustic classification according to the present disclosure. In addition to dynamic noise floor determinations a discrimination is made between the noise floor and any cyclostationary event presence. If there is detected a cyclostationary event, a determination is made for the presence of a piston (or other) engine. The results of these determinations are provided to a neural network for further classification. Each cycle of the method is output to the multimodal fuser for consideration and determination with respect to other inputs to the fuser.

With these classification elements understood we now describe the multimodal fuser element. As may be observed from FIG. 1, the multimodal fuser receives the raw data from the IR and magnetic sensors, as well as the analyzed data from acoustic and seismic classifiers described above. Upon receipt of this data, the multimodal fuser correlates the data received so as to determine whether sensed targets are in fact within the sensor field and are the type(s) of targets determined.

With respect to vehicle classification, the multimodal fuser determines seismic and acoustic activity trends over entire detection period(s). The acoustic and seismic data are correlated with one another to find any matching trends in activity thereby assuring that both modalities are perceiving/classifying the same target. More particularly, the multimodal fuser correlates the X-axis and Y-axis seismic activity during an event to an envelope of an acoustic signal. Consequently, the seismic sensors are used to find any existing coherence to the acoustic signal. As such, it may be concluded that each detected signal results from the same source and not the result of one or more anomalies.

Additionally, acoustic trends are analyzed to see if any drop-off of target noise takes place. More particularly, the acoustic signal is analyzed in the time-domain after a target has left the field of detection. Operationally, a simplified envelope method is applied to examine signal trending indicative of a passing vehicle. If, for example, there is no indication based on the envelope that a vehicle is passing, then it may be concluded that there is insufficient signal strength to make an accurate decision about the presence of a vehicle.

In addition to the correlative processes noted, the multimodal fuser performs temporal filtering functions to determine whether a possible target is acting according to an expected timeline, i.e., performs an "anti-loiter determination" function. For example, if an animal enters the sensor field and loiters therein, it would not produce the same signature as a person or persons crossing through the sensor field. Accordingly, in the anti-loiter determination function of the present invention, our multimodal fuser determines the probability that a non-vehicle target is a human or an animal, and reports accordingly.

As may be appreciated, the multimodal fuser correlates different types of sensor data to determine the direction of travel of a sensed target. In a preferred embodiment, this process uses the seismic X-axis and Y-axis to determine a compass direction of the target. In making this determination, the multimodal fuser determines on a single axis if the seismic activity appears normal. This determines on which side of the axis the target seismic activity is taking place. The activity's location on the opposing axis is determined by looking at how the signal on that axis correlates to the axis that has been determined. If the two axes appear to oppose each other in movement, then it may be determined that the target signal is located on opposite sides of each axis.

With the above determinations, the multimodal fuser determines whether the target is a target of interest. Of course, users of the system and method may designate what constitutes a target of interest. If such a detected target is not a target of interest, then the fuser may command any sensors to return to a low power mode so as to conserve power. If, however, the target is a target of interest, then a report to a user may indicate the target classification (type of target), time of detection, and probability(ies) of target classification. Upon providing the user report, the system may again resume low power mode until another target is sensed.

Figure 5:
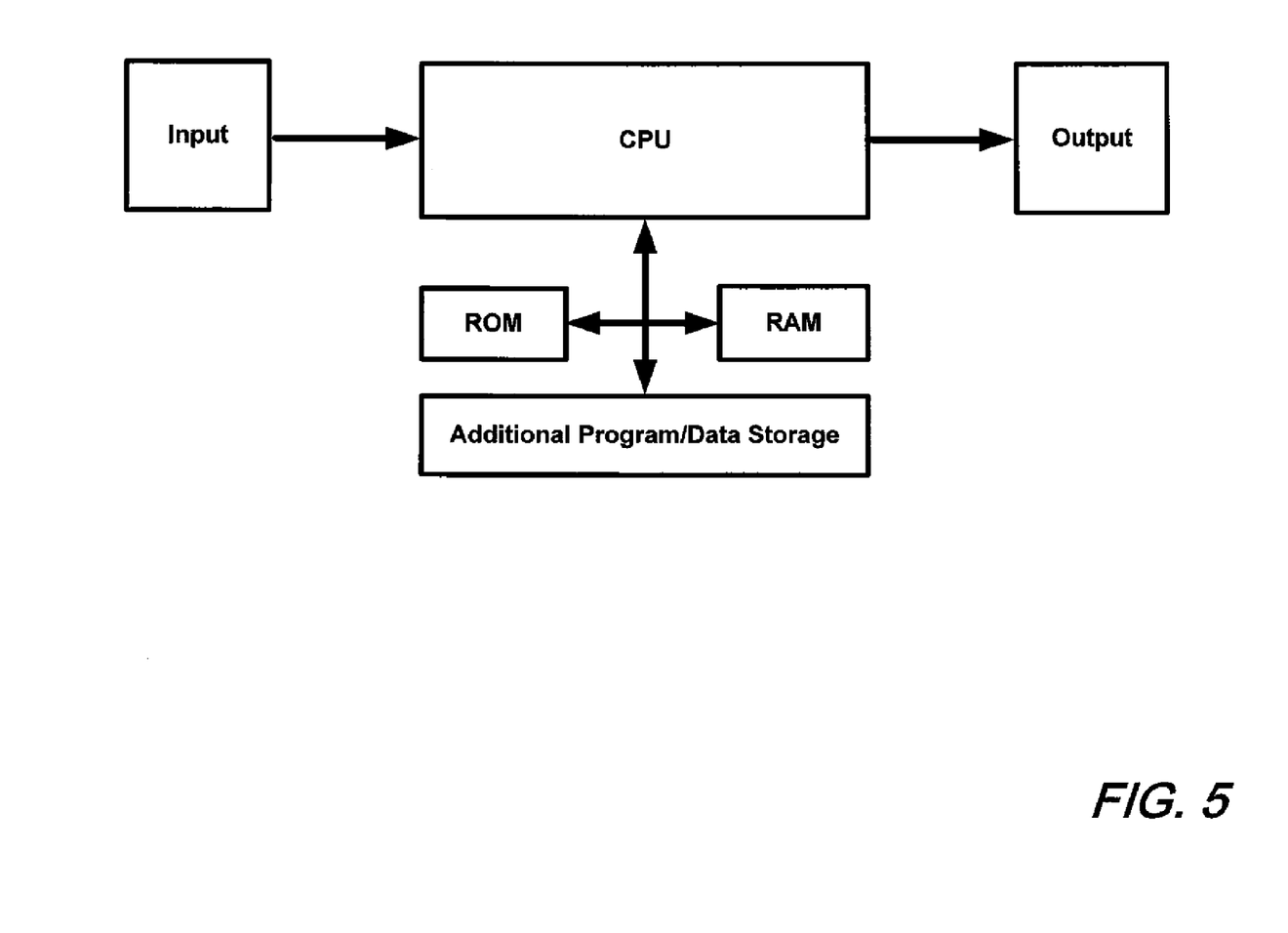
FIG. 5 is a schematic block diagram of a representative computer system for executing the method according to the present disclosure.

Since the method according to the present disclosure is computational in nature it may advantageously be performed by a contemporary computer system comprising any of a variety of central processing units, memory, and input/output systems. Accordingly, the computer system will execute an operating program which may collect and process the sensor data. Such a representative computer system is shown schematically in FIG. 5. Operationally, the computer system may read a computer program residing in memory and/or input/output systems and execute the program which in turn results in the execution of the method steps which are one aspect of the instant disclosure.

At this point, while we have discussed and described the invention using some specific examples, those skilled in the art will recognize that our teachings are not so limited. Accordingly, the invention should be only limited by the scope of the claims attached hereto.

What is claimed is:

1. A computer implemented method for detecting and classifying targets within a sensor field comprising the steps of:
   detecting the presence of a target within the sensor field;
   collecting data associated with the target, said data including seismic data and acoustic data;
   classifying the data through the effect of a footstep classifier, a seismic cyclostationary classifier and an acoustic classifier;
   determining a classification for the target based upon the footstep classification, the cyclostationary classification and the acoustic classification; and
   providing an indication of the target classification to a user.

2. The method of claim 1 wherein said detecting step is performed in a low power operational mode and said collecting, classifying, determining and providing steps are performed in a high power operational mode.

3. The method of claim 2, further comprising the step of:
   returning to the low power operational mode after providing the indication of the target classification to the user.

4. The method of claim 1, wherein said data collection step further includes collection of magnetic data and infrared data.

5. The method of claim 1, wherein said determining step determines whether the target is a human.

6. The method of claim 5, wherein said determining step determines whether the target is a vehicle.

7. The method of claim 6, further comprising the step of:
   determining the direction of travel of the target within the sensor field.

8. The method of claim 1, further comprising:
   an anti-loitering determination step wherein movement of the target within the sensor is analyzed to determine whether the targets movement is characteristic of a human or non-human.

9. A computer program recorded on a computer-readable recording medium said program causing the computer to detect and classify targets within a sensor field by executing the steps of:
   detecting the presence of a target within the sensor field;
   collecting data associated with the target, said data including seismic data and acoustic data;
   classifying the data through the effect of a footstep classifier, a seismic cyclostationary classifier and an acoustic classifier;
   determining a classification for the target based upon the footstep classification, the cyclostationary classification and the acoustic classification; and
   providing an indication of the target classification to a user.

10. The computer program of claim 9, wherein said detecting step is performed in a low power operational mode and said collecting, classifying, determining and providing steps are performed in a high power operational mode.

11. The computer program of claim 10, further causing the computer to execute the steps of:
   returning to the low power operational mode after providing the indication of the target classification to the user.

12. The computer program of claim 10, further causing the computer to execute the step of:
   performing an anti-loitering determination analysis wherein movement of the target within the sensor is analyzed to determine whether the targets movement is characteristic of a human or non-human.

13. The computer program of claim 9, further causing the computer to execute said data collection step further including the collection of magnetic data and infrared data.

14. The computer program of claim 9, wherein said determining step determines whether the target is a human.

15. The computer program of claim 14, wherein said determining step determines whether the target is a vehicle.

16. The computer program of claim 15, further causing the computer to execute the step of:
   determining the direction of travel of the target within the sensor field.

17. A system for detecting and classifying targets within a sensor field comprising:
   a plurality of sensors for detecting the presence of a target within the sensor field, said sensors being positioned within the sensor field and including one or more seismic sensors and one or more acoustic sensors;
   a footstep classifier for classifying seismic data generated by the one or more seismic sensors;
   a seismic cyclostationary classifier for classifying seismic data generated by the one or more seismic sensors;
   an acoustic classifier for classifying acoustic data generated by the one or more acoustic sensors; and
   a fuser for determining a classification for the targets from the footstep classification, the seismic cyclostationary classification and the acoustic classification.

18. The system of claim 17, further comprising:
   a plurality of magnetic sensors; and
   a plurality of infrared sensors,
      wherein said fuser determines a classification for the targets from the footstep classification, the seismic cyclostationary classification and the acoustic classification.

19. The system of claim 17, further comprising a means for providing an indication of the target classification to a user of the system.

20. The system of claim 17, further comprising means for determining whether the target is a human.

21. The system of claim 17, further comprising means for determining whether the target is a vehicle.

22. The system of claim 17, further comprising means for determining the direction of travel of the target within the sensor field.

23. The system of claim 17, further comprising an antloitering determination means operable to determine whether the targets movement is characteristic of a human or non-human.

* * * * *